April 30, 1957 R. F. SEKUL ET AL 2,790,841
PROTECTIVE ELECTRICAL SWITCHING SYSTEM
Filed Dec. 29, 1950 2 Sheets-Sheet 1

INVENTORS
Raymond F. Sekul
Charles H. Fenske
BY
R. W. Hodgson

United States Patent Office 2,790,841
Patented Apr. 30, 1957

2,790,841

PROTECTIVE ELECTRICAL SWITCHING SYSTEM

Raymond F. Sekul and Charles H. Fenske,
Los Angeles, Calif.

Application December 29, 1950, Serial No. 203,496

22 Claims. (Cl. 123—146.5)

Generally speaking, the present invention relates to the electrical switching art and more particularly to a novel protective, electrical switching system intended for protective cooperation wtih one or more electric power utilization circuits, preferably though not necessarily, associated with an internal combustion engine or a vehicle powered by an internal combustion engine. The system of the present invention is adapted to effectively disconnect the various electric power utilization circuits normally connected to a source of electric power such as a storage battery or the like, after inactivation of the internal combustion engine so as to prevent the inadvertent discharge of the storage battery during periods of non-use of the internal combustion engine. The system of the present invention is so arranged as to be capable of ready and easy installation in existing automobiles and does not require factory installation (although it can be so installed). This greatly increases the utility and value of the invention. The device is also well adapted for protective use in military vehicles so as to prevent the inadvertent discharge of their storage batteries when they are hastily abandoned—say while under attack, and to effectively deenergize the internal combustion engine, lights and the like, which may be of vital importance during and after the emergency.

It is a very common experience for the user or operator of a motor vehicle to return to the parked automobile after having been elsewhere for a considerable period of time only to find that the storage battery has become virtually completely discharged (and/or possibly irreparably damaged) because the storage battery has been inadvertently discharging continuously while the operator or driver was away from the vehicle. This may occur for a number of different reasons. The driver may forget to turn the ignition key to the off position to disconnect the ignition system from the storage battery. This will constitute a serious drain on the storage battery and also may ruin various components in the ignition system so as to require complete replacement. Another very common cause of inadvertent battery discharge during periods of non-use is a defective stop light switch (usually coupled to the foot brake) which may remain on even after the foot brake is released thus draining the battery. Another frequent cause of complete battery discharge is forgetting to switch off the headlights, or other accessory equipment such as radios and the like, when leaving the vehicle. Also electrical shorts may develop in any of the electric power utilization circuits which will cause a continuous drain on the storage battery. Irrespective of the cause, the situation confronted by a motorist returning to his car and finding that the battery is completely discharged, is exceedingly provoking and may cause serious and costly loss of time (the time aspect is particularly important in emergency situations), and may also require costly and time consuming repairs. When this occurs, it will usually be necessary to telephone for a mechanic, who will come to the place at which the vehicle is stalled (usually after a considerable time delay), and replace the discharged storage battery (and/or any other motor parts damaged as a result of the long continued battery drain) and the vehicle will then be ready to start. Of course, the cost and time delay involved in the above mentioned procedure can be eliminated in some cases if the stalled motor vehicle is placed in gear and is vigorously pushed along a road, highway, or the like, which will impart torque through the wheels and the drive shaft to the engine thus tending to start the engine if there is sufficient charge left in the battery to supply the necessary spark. However, this arrangement requires, in the case of manual pushing, that either a number of people push simultaneously, one very strong person push or that the car be of a very light weight capable of being pushed by an average person. Of course, another motor vehicle can be employed to push the stalled car. However, it is usually inconvenient to be forced to rely upon any of the above mentioned haphazard methods. In addition, more and more automobiles are being equipped with various types of automatic and/or hydraulic transmissions and/or torque converters. It is very difficult if not impossible to start cars so equipped by pushing them. Therefore, the logical answer to the above mentioned problems is to avoid them entirely by not allowing inadvertent discharge of the automobile storage battery during periods of non-use.

In addition to the above, an extremely dangerous situation may arise from either inadvertent discharge of an automobile storage battery as mentioned above or discharge caused by shorts developing in the electric wiring system of the automobile. This is the danger of fire, which very easily can be caused by the overheating of various portions of the electric wiring system associated with an automobile as a result of excessive or overlong current discharge therethrough, or which can occur as a result of arcs, sparks, and the like frequently associated with electrical shorts. The fire hazard is greatly intensified because of the highly inflammable fuel (usually gasoline) customarily stored in a fuel tank associated with a motor vehicle which can very readily become ignited or even exploded with consequent likelihood of property damage and personal injury. Therefore, it is extremely desirable to minimize the possibility of battery discharge in a motor vehicle during periods of non-use, whether of the shorting type or any of the other above mentioned types.

Generally speaking, the present invention includes a protective, electrical switching system arranged to automatically, effectively disconnect a source of electric power (usually one or more storage batteries) from electric power utilization circuit means associated with an engine (usually an internal combustion engine in a vehicle powered by the engine) to prevent the inadvertent and undesired flow of electric current from the source of electric power (storage battery) during periods of non-use of the engine. The system includes switch means comprising main switch means, time delay means and switch actuating means arranged to effectively connect and disconnect a source of electric power (usually a storage battery) with respect to electric power utilization circuit means associated with an engine (and/or a vehicle carrying same). The time delay means, main switch means and actuating means are effectively arranged whereby said main switch means will be effectively opened after a delay following inactivation of the engine for effectively disconnecting the electric power utilization circuit means from the source of electric power (usually a storage battery).

In one general form of the present invention the time delay means, main switch means and actuating means are so arranged that the main switch means will open virtually immediately after inactivation of the engine but the time delay means (which may comprise a bypassing small current sensitive switch means) will remain closed for a time delay after inactivation of the engine and will finally open whenever current in excess of a predetermined value is flowing from the source of electric power therethrough.

In another general form of the present invention time delay main switch actuating means are provided and include coupling and decoupling means adapted when actuated in a first way to effectively couple the time delay main switch actuating means and the main switch means and adapted when actuated in a second way to effectively decouple the time delay main switch actuating means and the main switch means. In one form of the present invention the coupling and decoupling means include electrically responsive means arranged to actuate said coupling and decoupling means in the first way to effectively couple said time delay main switch actuating means and the main switch means whenever the storage battery discharges excess of a predetermined rate, and adapted to actuate said coupling and decoupling means in the second way to effectively decouple the time delay main switch actuating means from the main switch means whenever the storage battery discharges at less than a predetermined rate.

In one preferred general form of the present invention, the main switch actuating means includes latching means adapted to hold the main switch means in closed position when latched with respect thereto, spring means biasing the main switch toward open position, and unlatching means adapted to effectively unlatch the latching means after a time delay following inactivation of the internal combustion engine whereby the spring biasing means will cause the main switch means to open, thus effectively disconnecting the storage battery from the electric power utilization circuit means associated with the internal combustion engine (and/or a vehicle carrying same).

In a preferred form, the unlatching means comprises electro-mechanical translating means and the coupling and decoupling means includes coupling switch means adapted to selectively operatively deenergize the unlatching means and to selectively operatively place the unlatching electro-mechanical translating means in condition for energization whereby the main switch means will be effectively opened after a delay following inactivation of the internal combustion engine.

Also in a preferred general form of the present invention, electric current flow responsive electro-mechanical translating means is included and is operatively coupled to the coupling switch means to effectively actuate said switch means to effectively energize the unlatching electro-mechanical translating means whenever, after a delay following inactivation of the internal combustion engine, the storage battery discharges in excess of a predetermined rate. Also in a preferred general form of the present invention manually operable overriding control means may be arranged to move the main switch means in a selected direction and/or relatching means (which may be manually operable, electrically operable or otherwise) may be arranged to effectively close the main switch means and relatch it in said closed position when desired (usually upon returning to the motor vehicle) or when the vehicle is parked and an occupant thereof wishes to energize some electric power utilization circuit associated with the motor vehicle such as a radio, heater, parking lights, or the like. The arrangement of the present invention is such that this can be accomplished in automobiles of the newer type which are provided with ignition switches having an "on" position, an "off" position, and a "parking" position and are also capable of co-operation with automobiles having ignition switches adapted to assume only "off" and "on" positions.

Generally speaking, any type of time delay means is contemplated. For example, thermally responsive time delay means (whether self-heated or externally heated), dashpot means or other pneumatic or hydraulic means, or any other suitable time delay means may be employed. In one form of the present invention a thermally responsive means may be placed in heat conductive relationship with respect to a portion of the internal combustion engine which will be heated during operation; and in another form a pneumatic time delay means may be placed in communication with some region associated with the internal combustion engine wherein pressure changes will occur upon inactivation of the engine.

Also in one general form of the present invention acceleration sensitive overriding switch opening means may be provided and arranged for cooperation with the main switch means in a manner whereby sudden acceleration (either positive or negative) will effectively cause the main switch means to open thus disconnecting the source of electric power from any and all of the electric power utilization circuits associated with an engine or motor vehicle.

From the above general description of the present invention it will be understood that virtually all of the hereinabove mentioned disadvantages arising from the prior art lack of means adequate to cope with the enumerated problems, are completely overcome. For example, a motorist driving an automobile equipped with the form of the present invention wherein the coupling and decoupling switch means and the electric current flow responsive electro-mechanical translating means are included, can stop his automobile and leave same. In the event that he has forgotten to turn off the ignition, lights, or any other power utilization devices associated with the automobile (or the engine), the current sensitive electro-mechanical translating means will effectively actuate the coupling switch means to the first position (usually closed) to effectively place the unlatching electro-mechanical translating means in condition for main switch opening energization, which will take place as soon as the operation of the time delay means (which is caused by the inactivation of the internal combustion engine or the opening of the ignition switch) is completed. This will cause the main switch means to open and effectively disconnect the storage battery from all or any selected portion of the electric power utilization circuits associated with the motor vehicle thus virtually eliminating the possibility of inadvertent battery discharge and/or electric arcs, sparks and the like which would otherwise constitute a serious fire hazard. It should be noted that the time delay main switch actuating means will only be coupled to the main switch means if the storage battery discharges through the current flow sensitive electro-mechanical translating means in excess of a certain rate (which may be zero) and that therefore the main switch means will only be disconnected under such conditions. If no excessive battery discharge occurs during the period of non-use of the motor vehicle the above system will be inoperative and when the driver returns to the motor vehicle it will be ready to start.

In the other general form of the present invention wherein the coupling and decoupling switch means and translating means are not included, the main switch means will always be effectively opened following a time delay after inactivation of the internal combustion engine when excessive current is drawn. Upon returning to the vehicle the operator can effectively close the main switch means by manually resetting or relatching the main switch. In certain cases this can be done by turning on the ignition. It should be noted that selectively operable reset or relatching means may be provided to reset the system in operative condition with the main switch again closed for energization of the electric power utilization circuits associated with the motor vehicle upon return of the driver to the motor vehicle or to reset the system in operative condition with the main switch again closed for the energization of accessories such as radios, heaters, parking lights, and the like, during periods of non-operation of the engine. These may be manually or electrically operable.

It should also be noted that the form of the present invention employing acceleration sensitive overriding main switch opening means has certain advantages which may be of major importance under some circumstances. For example, in a motor vehicle (whether an ordinary automobile, truck, airplane, motor boat, or military vehicle) equipped with this form of the present invention, the source of electric power (usually one or more storage batteries or the like) will be effectively disconnected from the electric power utilization circuit means associated with the vehicle virtually immediately after any extremely abrupt stop or deceleration such as would follow the impact of a collision or accident. This may prevent the vehicle from careening wildly along completely out of control following the accident and may also eliminate the possibility of fire from broken electrical connections, which is a very great hazard in aircraft accidents. These may be manually or electrically operable.

With the above points in mind it is an object of the present invention to provide a novel, protective electrical switching system arranged to automatically effectively disconnect a source of electric power (usually one or more storage batteries) from electric power utilization circuit means associated with an engine to prevent the inadvertent flow of electric current from the source of electric power (usually one or more storage batteries) during periods of non-use of the engine.

A further object of the present invention is to provide a novel protective electrical switching system arranged to automatically effectively disconnect a primary source of electric power (usually one or more storage batteries) from electric power utilization circuit means associated with an internal combustion engine to prevent the inadvertent flow of electric current from the primary source of electric power (usually one or more storage batteries) during periods of non-use of the internal combustion engine. The arrangement being such that said disconnection only occurs if the storage battery is discharging in excess of a predetermined rate (which may be zero, if desired).

A further object of the present invention is to provide a novel, protective electrical switching system arranged to automatically effectively disconnect a primary source of electric power (usually one or more storage batteries) from electric power utilization circuit means associated with an internal combustion engine to prevent the inadvertent flow of electric current from the primary source of electric power (usually one or more storage batteries) during periods of non-use of the internal combustion engine. The arrangement being such that said disconnection automatically occurs after operation of time delay means following inactivation of the internal combustion engine.

It is a further object of the present invention to provide a system of the character set forth in the above objects including acceleration sensitive overriding switch opening means arranged to effectively disconnect the source of electric power from the electric power utilization circuit means upon rapid acceleration (either positive or negative).

Other and allied objects will be apparent to those skilled in the art after a careful perusal, examination and study of the illustrations, specifications, and appended claims.

To facilitate understanding reference will be made to the hereinbelow described drawings, in which.

Figure 1:
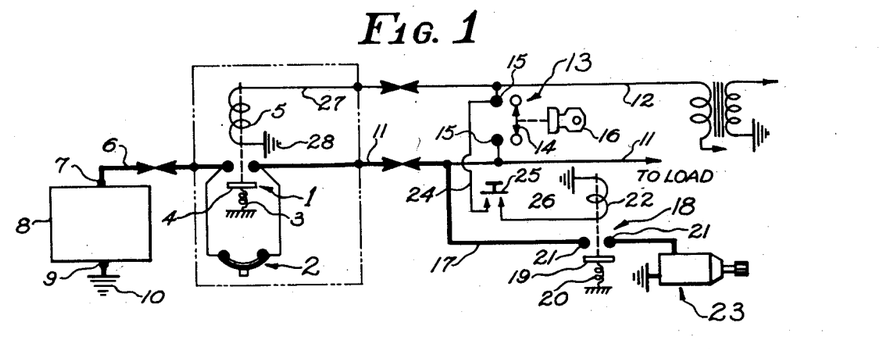
Fig. 1 is a diagrammatic, schematic view illustrative of one embodiment of the present invention.

Generally speaking, the first form of the present invention specifically illustrated in Fig. 1 comprises an electrical switching system arranged to automatically effectively disconnect a source of electric power (usually, though not necessarily, one or more electric storage batteries) from electric power utilization circuit means including at least one electric power utilization circuit associated with an engine (usually an internal combustion engine) and/or associated with a vehicle which may be powered by said engine, to prevent the continued inadvertent flow of electric current in excess of a predetermined value from said source of electric power during periods of non-use of said engine. The system consists of switch means including time delay means and switch actuating arranged to be responsive to inactivation of the engine in a manner whereby said switch means will not completely open until after a delay following inactivation of the engine whenever the source of electric power discharges in excess of a predetermined value thus effectively disconnecting the source of electric power from the electric power utilization circuit means.

In the specific example illustrated in Fig. 1 in schematic form, the switch means generically referred to above includes a main current switch means indicated generally at 1 and the time delay means which comprises a bypassing time delay switch means sensitive to electric current flow of small values, which is indicated generally at 2, and switch actuating means, which generally speaking comprises both a tension biasing spring 3 connecting one side of movable switch element 4 to a fixed point (thus tending to open the main current switch 1), and the switch closing relay coil 5 adapted to close the main current switch 1 when electrically energized. The switch means (including the main current switch means 1 and the bypassing small current time delay switch means 2), which in the specific example illustrated is of the thermally responsive type, is connected by a lead 6 to one terminal 7 of an electric power source indicated in diagrammatic block form indicated at 8, and which preferably, though not necessarily, may take the form of an electric storage batter or the like. The other terminal 9 of the electric power source 8 is grounded as indicated at 10. The other side of the switch means comprising the main current switch 1 and the bypassing thermally responsive small current time delay switch 2, is connected to a load lead 11 which is adapted to be connected to one or more of a plurality of electric power utilization circuit means (not shown) associated with an engine such as an internal combustion engine powering an automobile, for example. Such electric power utilization circuits include among others stop light circuits, tail-light circuits, headlight circuits, automobile interior body light circuits, horn circuits and accessory circuits such as for radios, heaters, parking lights, and the like. Also included is the ignition circuit for the internal combustion engine powering the automobile, although in the specific example illustrated in Fig. 1 the ignition circuit lead 12 is connected to the output load lead 11 through an independent separate manually actuatable ignition switch indicated diagrammatically at 13, which includes a movable element 14 (shown in open position) adapted to be brought into electrical engagement with contacts 15 for connecting the ignition circuit 12 to the output load lead 11 by manual actuation of the ignition key 16. Also connected to the output load lead 11 by another lead 17 is a normally open starter energizing switch indicated generally at 18 which comprises a movable contact element 19 normally spring biased open by spring 20 and adapted to be moved into closed position with respect to the contacts 21 in the lead 17 whenever the starter relay closing coil 22 is energized. This will temporarily connect the output load lead to the starter, indicated generally at 23, for energizing same to start the internal combustion engine of the motor vehicle (not shown). It should also be noted that the ignition switch 13 is also adapted, when closed by manual operation of the key 16, to effectively connect the output lead 11 through a lead 24, a manually operable pushbutton switch 25 and the starter relay closing coil 22 to ground at 26. It should also be noted that the closure of the ignition switch 13 connects the output load lead 11 through a lead 27 and main switch closing relay coil 5 to ground at 28.

The operation of the above described form of the invention illustrated in Fig. 1 may be briefly set forth as follows.

The system illustrated in Fig. 1 as shown, is in the condition it would assume after inactivation of the internal combustion engine of a motor vehicle and after manually turning the ignition key 16 to the "off" position shown, thus opening the ignition switch 13 to the "off" position shown. When the driver desires to again energize the internal combustion engine, he will manually turn the ignition key 16 and the associated ignition switch 13 to "on" position with the member 14 in engagement with the electric contacts 15. This will allow electric current to flow from the electric power source 8 through the lead 6 and the bypassing small current thermally responsive time delay switch 2 (which is closed), through the output lead 11, through the ignition switch 13, the lead 27 and the main switch closing relay coil 5 to ground at 28. This will energize the main switch closing relay 5 and effectively close the main current switch 1, thus allowing the main current flow to pass directly through the main current switch 1 instead of the bypassing small current switch 2. Since the now closed main current switch 1 is connected to the output lead 11, any and all electric power utilization circuits which are connected to said output lead 11 will be electrically energized or will be capable of being electrically energized upon closure of suitable switch means (not shown) for selectively connecting said electric power utilization circuits (not shown) to said output lead 11. Also the output load lead 11 will be connected through the closed ignition switch 13 to the ignition lead 12 for electrical energization of the ignition system (not shown). The starter 23 can then be energized by manually (or pedally) closing the pushbutton switch 25 thus connecting the energized output load lead 11 through the closed ignition switch 13, lead 24 and starter switch closing relay coil 22 to ground at 26 thus energizing said starter switch closing relay coil 22 and temporarily closing the normally open starter switch 18 and energizing the starter 23 in order to start the internal combustion engine (not shown). When the engine is stopped by opening the ignition switch 13, the continuous duty main switch closing relay coil 5 will be deenergized thus allowing the biasing spring 3 to effectively open the main current carrying switch 1. This will effectively disconnect the output load lead 11 from the electric power source 8 as far as any large current flow is concerned. Small current flow from the electric power source to the output load lead 11 such as to an electric clock or the like, can continue to flow through the bypassing thermally responsive electrically sensitive time delay small current switch 2 without opening same. Current in excess of that required for an electric clock but still of a relatively small value can flow through the bypassing time delay switch 2 for a short period of time only because thermally responsive time delay switch 2 will become heated and will open thus entirely and completely disconnecting the electric power source 8 from the output load lead 11 after a time delay following inactivation of the internal combustion engine whenever electric current flows from the electric power source 8 through the output load lead 11 and is in excess of a predetermined value which will cause the actuation of the time delay means 2. After the time delay thermally responsive switch means 2 has cooled it will have to be manually reset before it will be ready for use when the ignition switch 13 is again closed.

Figure 2:
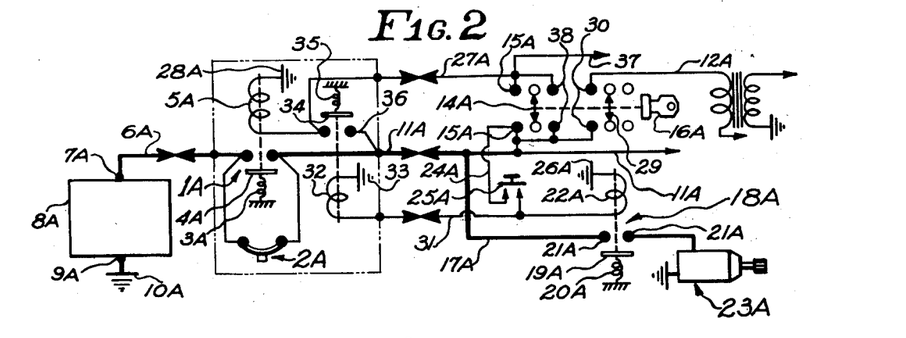
Fig. 2 is a diagrammatic, schematic view similar to Fig. 1 but of a slightly modified form of the present invention adapted for use with an engine ignition switch arranged to assume either an "on" position, an "off" position, or a "parking" position.

Fig. 2 illustrates in diagrammatic schematic form an extremely slight modification of the form of the present invention illustrated in Fig. 1 hereinabove described. The modification being such as to make the system adaptable for use in automobiles having an ignition switch capable of assuming an "on" position, an "off" position, and a "parking" position whereas the first form of the invention was for use with an ignition switch capable of assuming only an "on" position, and an "off" position. Since the two forms of the invention are identical in most respects similar reference numerals (followed by the letter A however) will be used in Fig. 2 to indicate parts corresponding to those illustrated in Fig. 1. New reference numerals will be used to indicate parts in Fig. 2 which differ from those illustrated in Fig. 1. In this modification of the present invention the ignition key 16A is adapted, in response to manual actuation, to simultaneously move two movable switch members 14A and 29 from the "off" position illustrated into an "on" position wherein the contact member 14A is in electrical engagement with the contacts 15A and the electrical contact member 29 is in engagement with the contacts 30. The engagement of the contact member 14A with the contacts 15A is similar to that described hereinabove in connection with the first form of the present invention and the results thereof will therefor not be specifically described here. The closure of the electrical contact member 29 with respect to the contacts 30 merely acts to connect output load lead 11A to the ignition lead 12A. Also included is an additional lead 31 connecting the lead 24A through a switch closing relay coil 32 to the ground at 33. The relay coil 32 being coupled to and adapted to close a switch contact member 34, normally spring biased open by spring means 35, so as to effectively close and connect a lead 36 between the main switch closing relay coil 5A and the load lead 11A. The arrangement is such that actuation of the starter pushbutton switch 25A causes energization of the starter 23A and closure of the switch member 34 and the main switch 1A to prevent the switch member 2A from blowing. It should also be noted that an additional accessory output lead 37 is connected to the lead 27A in this modified form of the present invention instead of having the accessories connected directly to the load lead 11A. The accessories adapted to be connected to the accessory lead 37 are of the type which on some occasions may be used while the internal combustion engine is not in operation and while the motor vehicle is parked, such as radios, heaters, parking lights, and the like. In such cases the ignition key 16A is moved to parking position and the contact member 14A makes engagement with the contacts 38 which operate in the same manner as the contacts 15 and the contacts 15A in this modified form. Therefore this phase of the operation of the modified form of the invention when the ignition switch is in parking position will not be described in detail, except to point out that the accessories output lead 37 is effectively connected to the output load lead 11A and to point out that the main current switch 1A is closed thus effectively connecting the electric power source 8A to the output accessories lead line 37. When the ignition switch is in "parking" position the other contact member 29 is completely disengaged from the electrical circuits and serves no purpose.

Figure 3:
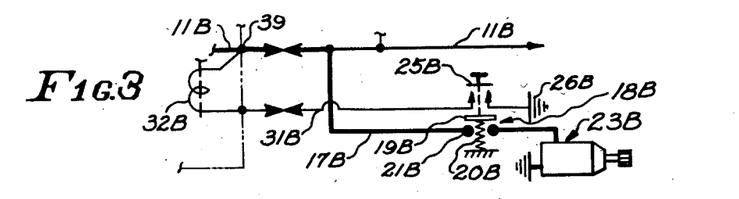
Fig. 3 is a fragmentary, diagrammatic, schematic view of a slightly modified arrangement of either Figs. 1 or 2 for cooperation with a different engine starting arrangement (pedally operable).

Fig. 3 is a fragmentary view of a modified portion of the invention shown in Fig. 2 for use with a slightly different type of starter motor and starting system. Similar parts will be indicated by similar reference numerals (followed by the letter B however). The major differences between the modification shown in Fig. 3 and that shown in Fig. 2 is that the coil 32B is connected at 39 to the output load lead 11B instead of being connected to ground as was the case in Fig. 2, and the other end of the coil 32B is connected by the lead 31B directly to a pedally operable pushbutton switch 25B, the other side of which is connected directly to ground at 26B. In this modification there is no starter switch closing coil corresponding to the coil 22A in Fig. 2. The starter switch 18B being adapted to be mechanically closed at the same time that the pedally operable push switch 25B is closed. The modified form of the present invention shown in Fig. 3 also eliminates the lead 24A shown in Fig. 2. Otherwise it is the same and the operation is virtually identical.

Figure 4:
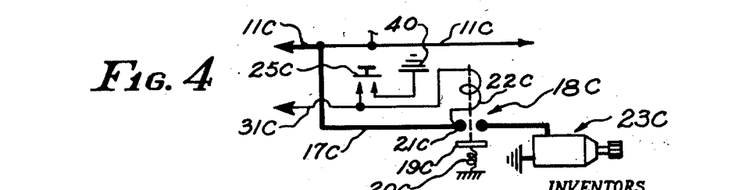
Fig. 4 is a fragmentary, diagrammatic, schematic view of a slightly modified arrangement of either Figs. 1 or 2 for cooperation with a different engine starting arrangement.

Fig. 4 illustrates in fragmentary form another slightly modified version of the embodiment of the present invention shown in Fig. 2 intended for cooperation with a slightly different type of starter motor and starting system. In this modification similar parts will be indicated by similar reference numerals (followed by the letter C however). In this modification the lead 24A shown in Fig. 2 is eliminated and the pushbutton switch 25C is connected to ground at one end as indicated at 40 and is connected at the other end to the lead 31C, which is connected to one end of the starter switch closing relay coil 22C, the other end of which is connected to the lead 17C. The operation of this form of the present invention is obvious and will therefore not be described in detail.

Figure 5:
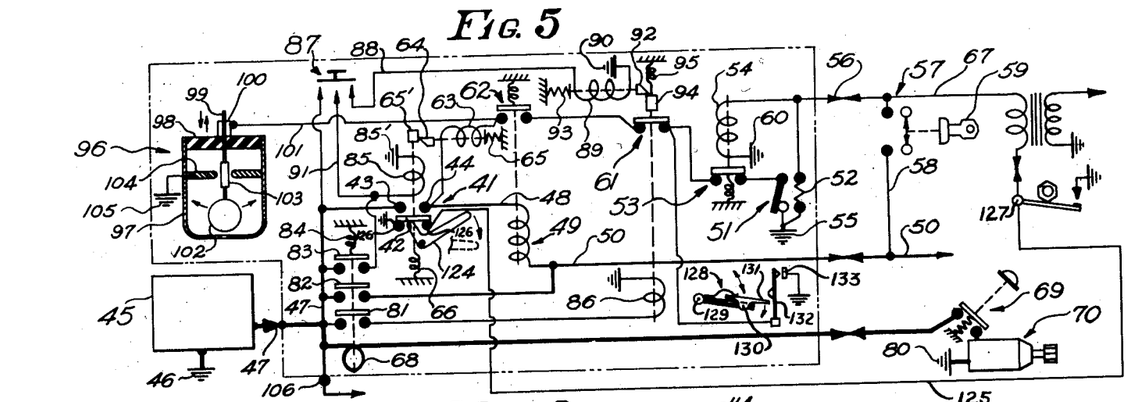
Fig. 5 is a diagrammatic, schematic view of another illustrative embodiment of the present invention.

Fig. 5 illustrates a modified form of the present invention. Generally speaking, the modified form of the present invention shown in Fig. 5 includes main switch means arranged to effectively connect and disconnect a source of electric power with respect to electric power utilization circuit means associated with an engine (usually an internal combustion engine in a motor vehicle). Also included is time delay main switch actuating means responsive to inactivation of the engine and including means effectively operatively coupling the time delay main switch actuating means and the main switch means whereby said main switch means will be effectively opened after a time delay following inactivation of the engine to effectively disconnect the source of electric power from the electric power utilization circuit means associated with the engine. The means effectively operatively coupling the time delay main switch means includes coupling and decoupling means adapted when actuated in a first way to effectively couple the time delay main switch actuating means and the main switch means. The coupling and decoupling means including electrically responsive means adapted to cause the actuation of said coupling and decoupling means in one way to effectively decouple the time delay main switch actuating means with respect to the main switch means whenever the source of electric power connected to the main switch means discharges at less than a predetermined rate and adapted to effectively cause the actuation of said coupling and decoupling means in another way to effectively couple said time delay main switch actuating means with respect to said main switch means whenever the source of electric power discharges in excess of a predetermined rate.

In the specific example illustrated in schematic form in Fig. 5, main switch means is indicated generally at 41 and includes a movable switch member 42 adapted to effectively connect contacts 43 and 44 when the main switch 41 is closed.

In the specific example illustrated, the primary source of electric power is indicated generally at 45, and one terminal is grounded at 46 and the other terminal is connected by a lead 47 to the above mentioned electric contact 43 forming part of the main switch 41. The other electric contact 44 of the main switch means 41 is connected through a lead 48 and a current flow sensitive electro-magnetic translating means, indicated generally at 49 (which will be more fully explained hereinafter) to an output load lead 50 which is adapted to be connected to one or more of a plurality of electric power utilization circuit means.

It is to be understood, of course, that suitable manually operable switch means can be connected to the output load lead 50, if desired, to make it possible to connect any one or more of the electric power utilization circuit means (not shown) to the output load lead 50 and through the coil 49 and main switch means 41 to the electric power source 45. Such switch means are not shown in detail since they are well known in the art.

Also generally speaking, the form of the present invention illustrated in Fig. 5 is provided with time delay main switch actuating means, including time delay means and main switch actuating means, which are responsive to inactivation of an internal combustion engine (usually through the opening of an ignition key). The time delay main switch actuating means being effectively coupled to the main switch means in a manner whereby said main switch means will be effectively opened after a delay following inactivation of the internal combustion engine to effectively disconnect the electric power utilization circuit means from the primary source of electric power.

In the specific example described and illustrated in Fig. 5, the time delay means comprises a thermally responsive switch means indicated generally at 51, an electric heating element 52 for heating same and a normally closed switch indicated generally at 53 adapted to be opened by relay coil 54 when energized. The lower ends of the thermally responsive switch means 51 and the heating element 52 are grounded as indicated at 55. The upper end of the heating element 52 is connected through a lead 56 to the ignition switch at 57 (which is adapted when closed to connect the lead 56 through a lead 58 to the main output load lead 50). The relay coil 54 is connected at one end to ground as indicated at 60 and is connected at the other end to the lead 56. The upper end of the thermally responsive element 51 is connected through the switch 53 through a switch indicated generally at 61, and through a coupling and decoupling switch indicated generally at 62, through an unlatching relay coil 63 to the terminal 44 of the main switch 41. Thus if the main switch 41, coupling and decoupling switch 62, the lock-in and lock-out switch 61 and the two time delay switches 53 and 51 are closed, the main switch unlatching means 63 will be effectively energized thus moving the latch 64 toward the right as viewed in Fig. 5 against the action of biasing spring 65 so as to disengage the latch 64 from a catch member 65' mechanically connected to the movable member 42 of the main switch 41. This will allow the main switch biasing spring 66 to open the main switch 41 to the position shown in Fig. 5. It should be noted that the above described sequence only occurs immediately after the ignition key 59 has been actuated so as to move the ignition switch 57 from closed position into the open position illustrated. Under these circumstances current has been flowing through the heating element 52. The thermally responsive switch 51 has been open. The relay coil 54 has been energized and the switch 53 has been open. The main switch 41 also has been closed. Immediately after opening the ignition switch 57 the relay coil 54 is deenergized and the spring biased switch 53 closes. The heating element 52 is deenergized and the thermally responsive switch 51 begins to cool off. After a time delay during which the thermally responsive switch 51 is cooled, it will automatically close thus completing a circuit from the electric power source 45 through the lead 47, the main switch 41, the unlatching relay coil 63, the coupling and decoupling switch 62 (if it is held closed by the current sensitive coil 49 connected to the output load lead 50 because current in excess of a predetermined value is flowing therethrough) through the closed overriding lock-in and lock-out switch 61, through the closed switch 53 and the closed thermally responsive switch 51 to ground. This energizes the unlatching relay coil 63 as hereinabove indicated and allows the main switch 41 to open thus effectively disconnecting the source of electric power 45 from the output load lead 50. It is important to note that if current is not flowing through the current sensing relay coil 49 the above described sequence of operation will not complete a circuit to the unlatching coil 63 and the main switch means 41 will remain closed.

It should also be noted that closure of the ignition switch 57 effectively connects the output load lead 50 to an ignition output lead 67.

The form of the present invention illustrated in Fig. 5 also includes starter motor current sensitive switch actuating means and multiple switch means adapted to be closed whenever current flows to the starter motor. In the specific example illustrated, the starter motor current sensitive switch actuating means comprises a relay coil 68 connected at one end to the electric power source 45 and at the other end through a starter motor switch indicated generally at 69 to a starter motor indicated generally at 70, the other end of which is grounded at 80. The multiple switch means adapted to be simultaneously closed upon energization of the starter motor current sensitive coil 68 are indicated at 81, 82, and 83 and are all normally spring biased opened by a suitable spring 84. The switch 82 is adapted, when closed in response to energization of the starter motor 70, to effectively connect the electric power source 45 through the output lead 50, lead 58 and closed ignition switch 57 to the ignition output lead 67. This is for the purpose of supplying the automobile ignition system with power whenever the ignition switch 57 is closed and the starter motor is energized. This is for momentary use only during the depression of the starter motor switch 69. The switch 83, when closed in response to energization of the starter motor 70, effectively energizes a relatching coil 85 adapted to effectively close main switch 41 and move the catch 65' upwardly to an extent such that the spring biased latch 64 can move toward the left as viewed in Fig. 5 and retain the catch 65 and the movable member 42 of the main switch 41 in closed position. This action is also only momentary and occurs during the short period of depression of the starter switch 69. However, the main switch 41 remains in latched position and can be unlatched only by a subsequent energization of the unlatching coil 63. The lower switch member 81, when closed in response to momentary energization of the starter motor 70, effectively energizes the overriding or lock-in and lock-out relay coil 86 which is adapted to effectively close the overriding lock-in or lock-out switch 61 if it has been open. If said switch has been closed the overriding lock-in and lock-out switch relay actuating coil 86 produces no useful result.

The form of the present invention illustrated in Fig. 5 is provided with selectively operable overriding means for effectively causing the main switch means to close and remain closed for the energization of electrical accessories associated with an automobile, even after the ignition switch has been opened and the automobile engine stopped. In Fig. 5, this takes the form of a manually operable pushbutton switch 87 adapted to effectively connect the electric power source 45 through the lead 47 and a lead 88, through an overriding lock-in and lock-out unlatching relay coil 89 to ground at 90. The pushbutton switch 87 is also adapted to connect the electric power source 45 through the lead 47 and a lead 91, through the main switch latching relay coil 85 to ground at 85'. Thus it will be seen that with the entire system in the condition shown in Fig. 5 (which corresponds to an inactive period of the motor vehicle), the overriding parking and reset pushbutton 87 can be momentarily depressed which will simultaneously energize the main switch latching relay coil 85 and close the main switch 41, and will energize the overriding lock-in and lock-out switch unlatching relay coil 89 so as to cause the latch 92 to be moved toward the left against the action of biasing spring 93 and to become disengaged from the catch 94 connected to the switch 61 so as to allow a biasing spring 95 to open the overriding lock-in and lock-out switch 61. This will effectively prevent the time delay switch 51 and the associated electro-magnetically operated switch 53 from effectively causing energization of the main switch unlatching coil 63, which could ordinarily cause the main switch to open immediately if any substantial current flows through the load current sensing coil 49 and the output load lead 50 to current consuming accessories such as a radio, heater, parking lights or the like, which are being operated while the car is parked and the ignition switch is open. Thus the overriding parking and reset pushbutton switch 87 and the two abovementioned circuits make it possible to energize accessory devices of the character above indicated when the ignition switch is open and when ordinarily the main switch 41 would immediately open to disconnect such devices.

An auxiliary time delay means operated switch means 132 may, if desired, be effectively connected in parallel with the switch 53 and thermal switch 51 between the right hand terminal of the switch 61 and ground so that the system will operate generally as above described even if the ignition switch is inadvertently left in "on" position when the driver leaves the car (or during any intended non-use period). The movable switch member 132 (which is normally out of contact with the other switch member 133) will be momentarily closed after a time delay following inactivation of the internal combustion engine by reason of the thermally caused actuation (clockwise) of time delay means, indicated generally at 128, after the internal combustion engine, or a portion thereof, cools to a selected temperature, thus causing the thermally responsive time delay means 128, which is in effective heat transfer relationship with respect to the engine, to move the member 131 in clockwise direction with respect to the mounting point 129. This will cause the member 131 to momentarily move the switch member 132 toward the right as viewed in Fig. 5 and into momentary electrical contact with the switch member 133, thus effectively bypassing the switch 53 and the switch 51 and causing the system to function in the hereinabove described manner when the switches 51 and 53 close after the ignition switch is opened. However, in this bypassing arrangement, it does this even if the ignition switch is still closed but the motor is stopped for any reason whatsoever. It should be noted that upon reactivation of the motor the thermally responsive time delay means 128 will be reheated and caused to move in counterclockwise direction from the position shown in Fig. 5. However, this will not cause the switch including members 132 and 133 to be closed because the actuating member 131 is pivotally spring biasedly mounted at 130 so as to be incapable of switch actuation when moving in counterclockwise direction.

The form of the present invention illustrated in Fig. 5 may include acceleration sensitive overriding switch means adapted to effectively cause the opening of the main switch means whenever subjected to acceleration (either positive or negative) in excess of a predetermined value. In the specific example illustrated, the acceleration sensitive means is indicated generally at 96 and comprises a hollow chamber 97 having a closed insulating top 98 provided with a central aperture through which an elastic rod 99 extends downwardly. The upper end of the rod 99 (which is electrically conductive) is mounted in electrical contact with a fixed member 100 which is connected by a lead 101 to the junction point of the coupling and decoupling switch 62 and the main switch unlatching relay coil 63. The lower end of the rod 99 is provided with a suitable weight indicated at 102. Positioned on the rod 99 above the mass 102 is an annular electrical contact member 103 which is concentrically positioned within a cylindrical centrally apertured electrode 104. The arrangement is such that an annular gap exists between the electrodes 103 and 104. The electrode 104 is grounded as indicated at 105. It will be understood that acceleration (either positive or negative) having a directional component at right angles to the axis of the rod 99 will cause the rod 99 to bend. If this acceleration exceeds a predetermined value the electrodes 103 and 104 will make electrical engagement and cause energization of the main switch unlatching relay coil 63 which will effectively open the main switch 41. This will be of great value in preventing fires following major aircraft crashes and the like, and also will prevent a motor vehicle from running wildly out of control after an accident involving an impact. This may also be so arranged as to be of considerable value in military vehicles where the sudden approach of the enemy may necessitate hasty though temporary abandonment. In the past, under such circumstances, frequently the abandonment was so rapid that the various electric power utilization devices associated with the military vehicle were left on. This frequently caused such a severe battery drain that there was insufficient power available to start the vehicle upon return thereto. It will be understood that the acceleration sensitive overriding switch means of the present invention may be so adjusted that an extremely rapid, abrupt stop of such a motor vehicle will automatically disconnect all such electric power utilization devices. Furthermore, the device may be adjusted to effectively disconnect all electric power utilization devices whenever an enemy shell or the like, strikes the military vehicle.

If desired, means may be provided for positively rendering the ignition system inoperative following actuation of the acceleration sensitive means 96. This may be necessary in certain cases because a car generator may continue to be driven by the internal combustion engine and supply the ignition system with electrical power even after actuation of the acceleration sensitive member 96 and effective disconnection of the electric power supply 45. This may include contacts 126 adapted to be electrically connected when the main switch 41 is in open position, as shown in Fig. 5, and a lead 125 connecting the right hand contact 126 to the breaker point arm at 127. The other contact 126 is grounded. Thus whenever the main switch 41 is open, the ignition system is effectively grounded and thereby rendered inoperative.

It should be noted that it is possible to by-pass the main switch means by connecting a device directly to the electric power source 45 and that this may be desirable for certain types of apparatus. One such non-safetied power terminal is indicated generally at 106 and is intended primarily for, though not limited to, use for energizing an electric clock or the like.

A manually operable overriding main switch closing means may be provided as indicated at 124 so that the main switch means 41 can be closed irrespective of the rest of the system, when desired.

Figure 6:
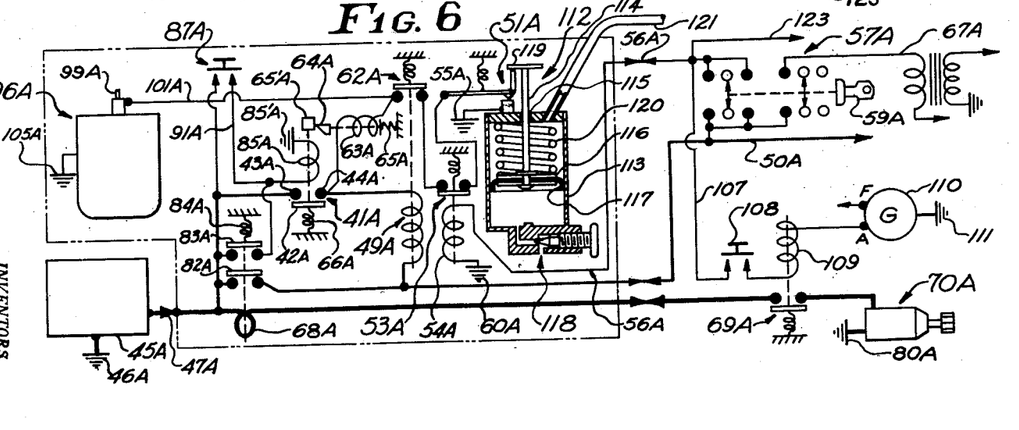
Fig. 6 is a diagrammatic, schematic view similar to Fig. 5 but of a slightly modified form of the present invention adapted for use with an engine ignition switch arranged to assume either an "off" position, an "on" position or a "parking" position.

Fig. 6 illustrates in diagrammatic, schematic form a version of the present invention very similar to that illustrated in Fig. 5 with very slight modifications, and similar parts will be indicated by the same reference numerals followed by the letter A however. This form of the present invention is adapted for use with an automobile ignition switch capable of assuming an "on" position, an "off" position and a "parking" position, whereas the form of the present invention illustrated in Fig. 5 is adapted for use with the ordinary type of ignition switch capable of assuming only an "on" position and an "off" position. In Fig. 6, the ignition switch is so arranged that when in either the "parking" position or the "on" position the output lead 50A is effectively connected to a lead 107 which is connected to a manually selectively operable pushbutton switch 108 which is connected to one end of a starter switch closing relay coil 109, the other end of which is connected through a generator 110 to ground at 111. The ignition switch 57A is also so arranged that when in the "on" position the output load lead 50A is effectively connected to the ignition output lead 67A. The arrangement is such that closure of the starter pushbutton switch 108 causes energization of the starter switch closing relay coil 109 which closes the starter switch 69A thus momentarily energizing the starter 70A. The heater 52 and the thermally sensitive switch means 51 shown in Fig. 5 are eliminated in Fig. 6, and in place thereof a pneumatic time delay switch actuating means indicated generally at 112 is provided which is adapted to actuate the time delay switch means 51A. The pneumatic time delay means comprises a closed chamber 113 having a stem 114, extending through a sealed port 115 in the top of the chamber 113 downwardly into the interior thereof and provided with a piston 116 and a flexible cup 117 (usually leather) mounted thereon. It should be noted that an adjustable needle valve, indicated generally at 118 communicates the interior lower region of chamber 113 with the exterior thereof. It should also be noted that the switch 51A, which is normally open, is arranged to be closed by downward movement of the cup 117, the stem 114 and a switch actuating annular member 119 carried by the stem 114, and that upward movement of the leather cup 117 and the stem 114 will allow the switch 51A to open. It should also be noted that a biasing spring 120 is positioned in the upper portion of the enclosed chamber between the top wall thereof and the piston member 116 and tends to bias the piston member 116, the leather cup 117, and the stem 114 into downward switch closing position as illustrated. It should also be noted that the upper portion of the chamber above the piston 116 and the leather cup 117 is provided with a conduit 121 which is adapted to be connected to the intake manifold of an internal combustion engine (not shown) or other region of variable pressure. It will be understood that while the ignition switch 57A is in closed position and the internal combustion engine is running the reduced pressure in the manifold is communicated with the upper portion of the chamber 113 by means of the conduit 121 and that the lower portion of the chamber 113 below the leather cup 117 is virtually at atmospheric pressure because it is in communication with ambient atmosphere through the needle valve 118. Therefore the leather cup 117 and stem 114 will assume a position considerably higher than that shown in Fig. 6 where the differential force exerted upwardly across the leather cup 117 will be counterbalanced by the downward force exerted by the spring 120. In such position the switch 51A will, of course, be open. After the ignition switch 57A is opened the internal combustion engine stops and the intake manifold pressure rises to normal thus virtually equalizing the pressure on both sides of the leather cup 117 in the chamber 113. This allows the spring 120 to attempt to move the leather cup 117 downwardly. However, it can only do this relatively slowly at a rate depending upon the setting of the needle valve 118. Thus a selected time delay will occur before the member 119 closes the switch 51A.

Another distinction between the modification shown in Fig. 6 and the form of the invention shown in Fig. 5 is that the overriding lock-in and lock-out switch 61 and unlatching relay coil 89 and the latching coil 86 shown in Fig. 5 are all eliminated entirely in Fig. 6. Also the switch member 81 adapted to momentarily energize the overriding lock-in and lock-out latching relay coil 86 shown in Fig. 5 is eliminated entirely. Also, in Fig. 6, an accessories output lead 123 is provided instead of connecting the accessories directly to the output load lead 50A. Otherwise the form of the present invention shown in Fig. 6 is identical with that shown in Fig. 5 and will therefore not be specifically described. In this connection, it should be noted that the means for positively rendering the ignition system inoperative whenever the main switch opens, and the auxiliary time delay means for causing the system to operate as described even if the ignition switch is inadvertently left on after inactivation of the engine, which were illustrated in Fig. 5, are not shown in Fig. 6, although they may be employed therein, if desired.

Numerous modifications and variations of the present invention will occur to those skilled in the art after a careful study thereof. All such properly within the spirit and scope hereof are intended to be included and comprehended as fully as if specifically described, illustrated and claimed herein. For example, the electric current flow sensitive means adapted to effectively close a coupling switch when electric current flows from the electric power source in excess of a predetermined rate so as to effectively couple the time delay main switch actuating means to the main switch means, may take a number of different forms other than those illustrated herein and may be of a magnetic or electro-magnetic type, a thermal type, a photoelectric type, an electronic and/or electronic relay type, an electrochemical type or any type capable of sensing and responding to current drain from the source of electric power.

Furthermore, in the first two forms of the present invention described and illustrated herein, the time delay current sensitive switch means is not limited to the specific forms described and illustrated but may comprise any low current interruptor of any desired type capable of functioning in the systems involved. Also the time delay means (including the auxiliary time delay means, which is optional) employed in the other forms of the present invention described and illustrated herein are not to be limited to those specifically illustrated but may be of any selected desired type including thermally responsive means, pneumatic means, dashpot means, time delay relay means of any type whether thermally, pneumatically, hydraulically, electronically, or electrically time delayed, motor driven timers or any other suitable type of time delay means, and the time delay may be of any desired length (including zero). Also the time delay means can either operate independently as in Fig. 5 for example, or can be physically connected to or associated with the engine, one form of which is illustrated in Fig. 6. It should also be understood that the type of main switch actuating means and means for coupling the time delay means with respect thereto are not limited to those specifically described and illustrated herein. Nor is the overriding parking and reset means limited to the specific arrangement described and illustrated herein. Any or all of the electro-magnetic translating means employed herein can be substantially modified. The means for positively rendering the ignition system inoperative whenever the main switch opens, may be modified or eliminated in certain forms of the present invention, if desired. The various latching means can also be varied within wide limits, if desired. The acceleration sensitive means can be modified within very wide limits or can be eliminated entirely. Numerous other arrangements and other components can be employed within the teachings of the present invention.

The embodiments of the present invention described and illustrated herein are exemplary only and are not intended to limit the scope thereof, which is to be interpreted in the light of the prior art and the appended claims only, with due consideration for the doctrine of equivalents.

We claim:

1. An electrical switching system cooperably arranged to automatically, effectively disconnect a source of electric power from electric power utilization circuit means including an ignition circuit associated with an internal combustion engine and provided with an ignition switch, to prevent the continued inadvertent flow of electric current in excess of a predetermined value from said source of electric power during periods of non-use of said engine, comprising: switch means including time delay means and switch actuating means cooperable for mounted relationship with respect to an internal combustion engine and source of electric power associated therewith and responsive, during periods when said ignition switch is open, to inactivation of said engine for a period of time and responsive to discharge from said source of electric power in excess of a predetermined value to actuate said switch means into open position, said switch means being effectively connected in circuit with said source of electric power and at least one electric power utilization circuit associated with the engine.

2. A system of the character defined in claim 1, wherein the time delay means is electric current sensitive whereby said switch means will completely open after a time delay following inactivation of the engine whenever the source of electric power discharges in excess of a predetermined value.

3. A system of the character defined in claim 2 wherein the switch means includes a main current switch means and a bypassing time delay switch means sensitive to small current flow, said main switch means being arranged to be opened by the actuating means virtually immediately after inactivation of the engine and said small current time delay switch means being arranged to open after a time delay following inactivation of the engine whenever the source of electric power discharges therethrough in excess of a predetermined amount.

4. A system of the character defined in claim 3, including selectively operable resetting means arranged to effectively close the main switch means and cause it to be maintained in said closed position.

5. A system of the character defined in claim 1, including acceleration sensitive overriding switch opening means cooperating with the switch means in a manner whereby abrupt changes in acceleration of the acceleration sensitive means will effectively cause the switch means to open thus effectively disconnecting the source of electric power from the electric power utilization circuit.

6. An electrical switching system cooperably arranged to automatically, effectively disconnect a source of electric power from electric power utilization circuit means including an ignition circuit associated with an internal combustion engine and provided with an ignition switch, to prevent the inadvertent flow of electric current from said source of electric power during periods of non-use of said engine, comprising: main switch means cooperable for mounted relationship with respect to an internal combustion engine and a source of electric power associated therewith and in circuit connecting and disconnecting relationship with respect to said source of electric power and said electric power utilization circuit means including at least one electric power utilization circuit associated with said engine; time delay-main switch actuating means including time delay means and cooperable main switch actuating means cooperable for mounted relationship with respect to said internal combustion engine, said time delay-main switch actuating means being effectively coupled to the main switch means and being responsive, irrespective of whether the ignition switch is open or closed, to inactivation of said engine and excess discharge from said source of electric power to effectively open said main switch means after a delay following inactivation of said engine for effectively disconnecting said electric power utilization circuit means from said source of electric power.

7. A system of the character defined in claim 6, including selectively operable overriding control means arranged to effectively, selectively close the main switch means.

8. A system of the character defined in claim 6, including acceleration sensitive overriding main switch opening means cooperating with the main switch means in a manner whereby abrupt changes in acceleration of the acceleration sensitive means will effectively cause the main switch means to open thus effectively disconnecting the source of electric power from the electric power utilization circuit means.

9. A system of the character defined in claim 6, wherein the time delay means comprises thermally responsive switch means adapted to be subjected to temperature changes following inactivation of the engine and adapted to translate said temperature changes into actuation of said thermally responsive switch means.

10. A system of the character defined in claim 6, wherein the time delay means comprises pneumatic means in operative relationship with respect to a region of varying pressure connected to the engine wherein pressure variations will occur subsequent to inactivation of the engine; said pneumatic time delay means being adapted to translate a predetermined pressure change following inactivation of the engine into opening actuation of the main switch actuating means.

11. A system of the character defined in claim 6, wherein the time delay means comprises switch means and dashpot switch actuating means arranged to be activated following inactivation of the engine.

12. An electrical switching system cooperably arranged to automatically, effectively disconnect a source of electric power from electric power utilization circuit means including an ignition circuit associated with an internal combustion engine and provided with an ignition switch, to prevent the inadvertent flow of electric current from said source of electric power during periods of non-use of said engine, comprising: main switch means cooperable for mounted relationship with respect to an internal combustion engine and a source of electric power associated therewith and in circuit connecting and disconnecting relationship with respect to said source of electric power and electric power utilization circuit means including at least one electric power utilization circuit associated with said engine; time delay-main switch actuating means cooperable for mounted relationship with respect to said combustion engine, said time delay-main switch actuating means including coupling means effectively operatively coupling the time delay main switch actuating means and the main switch means, said time delay main switch actuating means being responsive, irrespective of whether the ignition switch is open or closed, to inactivation of said engine and excess discharge from said source of electric power to cause said main switch means through the medium of the coupling means to be effectively disconnected to thus disconnect the source of electric power from the electric power utilization circuit means associated with the engine.

13. A system of the character defined in claim 12, wherein the means effectively operatively coupling the time delay main switch actuating means and the main switch means includes coupling and decoupling means adapted when actuated in a first way to effectively couple the time delay main switch actuating means and the main switch means.

14. A system of the character defined in claim 13, wherein the coupling and decoupling means includes electrically responsive means adapted to cause the actuation of said coupling and decoupling means in a second way to effectively decouple the time delay main switch actuating means with respect to the main switch means whenever the source of electric power discharges at less than a predetermined rate and adapted to effectively cause the actuation of said coupling and decoupling means in the first way to effectively couple said time delay main switch actuating means to said main switch means whenever the source of electric power discharges in excess of a predetermined rate.

15. A system of the character defined in claim 13, wherein the main switch actuating means includes: latching means adapted to hold the main switch means in closed position when latched with respect thereto; spring means biasing the main switch toward open position; and unlatching means adapted to effectively unlatch the main switch latching means after a time delay following inactivation of the engine whereby the spring biasing means will cause the main switch means to open thus effectively disconnecting the source of electric power from the electric power utilization circuit means associated with the engine.

16. A system of the character defined in claim 15, wherein the unlatching means comprises electromechanical translating means and wherein the coupling and decoupling means includes coupling switch means adapted to operatively deenergize the unlatching means whenever the source of electric power discharges at less than a predetermined rate and to operatively place the unlatching electromechanical translating means in condition for energization whenever the source of electric power discharges in excess of a predetermined rate whereby the main switch means will be effectively opened after a delay following inactivation of the engine.

17. A system of the character defined in claim 16, wherein electric current flow responsive electromechanical translating means is included and is operatively coupled to the coupling switch means to effectively actuate said switch means to effectively energize the unlatching electromechanical translating means whenever after a delay following inactivation of the engine the source of electric power discharges in excess of a predetermined rate.

18. A system of the character defined in claim 12, including selectively operable relatching means arranged to effectively close the main switch means and relatch it in said closed position.

19. A system of the character defined in claim 18, wherein the relatching means is effectively coupled to an engine starting switch whereby the main switch means will be effectively closed when the engine starting switch is closed.

20. A system of the character defined in claim 17, including selectively operable relatching means arranged to effectively close the main switch means and relatch it in said closed position.

21. A system of the character defined in claim 17, including selectively electrically energizable relatching means arranged to effectively close the main switch means and relatch it in said closed position.

22. An electrical switching system cooperably arranged to automatically, effectively disconnect a source of electric power from electric power utilization circuit means including an ignition circuit associated with an internal combustion engine and provided with an ignition switch, to prevent the continued inadvertent flow of electric current in excess of a predetermined value from said source of electric power during periods of non-use of said engine, comprising: switch means including time delay-switch actuating means cooperable for mounted relationship with respect to an internal combustion engine and source of electric power associated therewith and responsive, during periods when said ignition switch is open, to inactivation of said engine for a period of time and responsive to discharge from said source of electric power in excess of a predetermined value to actuate said switch means into open position, said switch means being effectively connected in circuit with said source of electric power and at least one electric power utilization circuit associated with the engine, said time delay-switch actuating means being electric current sensitive whereby said switch means will completely open after a time delay following inactivation of the engine whenever the source of electric power discharges in excess of a predetermined value.

References Cited in the file of this patent

UNITED STATES PATENTS

| | | |
|---|---|---|
| 1,327,790 | Taylor | Jan. 13, 1920 |
| 1,530,929 | Brobst | Mar. 24, 1925 |
| 1,558,101 | Lieb | Oct. 20, 1925 |
| 2,158,428 | Robertson | May 16, 1939 |
| 2,302,315 | Hall | Nov. 17, 1942 |
| 2,317,588 | Claytor et al. | Apr. 27, 1943 |
| 2,502,580 | McMillan | Apr. 4, 1950 |